United States Patent
Ching et al.

(10) Patent No.: US 11,220,074 B2
(45) Date of Patent: Jan. 11, 2022

(54) REDUCED WRINKLES IN MULTI-SECTION COMPOSITE TANK

(71) Applicant: Goodrich Corporation, Charlotte, NC (US)

(72) Inventors: Nathaniel Ching, Hartville, OH (US); Wenping Zhao, Glastonbury, CT (US); Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 134 days.

(21) Appl. No.: 16/682,131

(22) Filed: Nov. 13, 2019

(65) Prior Publication Data

US 2020/0215772 A1    Jul. 9, 2020

Related U.S. Application Data

(60) Provisional application No. 62/789,307, filed on Jan. 7, 2019.

(51) Int. Cl.
| | | |
|---|---|---|
| *B29C 70/56* | (2006.01) | |
| *B29C 33/52* | (2006.01) | |
| *B29K 105/08* | (2006.01) | |
| *B29L 31/00* | (2006.01) | |

(52) U.S. Cl.
CPC .............. *B29C 70/56* (2013.01); *B29C 33/52* (2013.01); *B29K 2105/0881* (2013.01); *B29L 2031/7126* (2013.01)

(58) Field of Classification Search
None
See application file for complete search history.

(56) References Cited

U.S. PATENT DOCUMENTS

| | | | |
|---|---|---|---|
| 3,210,228 A | * | 10/1965 | Bluck ...................... F17C 1/16 |
| | | | 156/172 |
| 3,357,875 A | | 12/1967 | Corbin, Jr. |
| 3,508,677 A | * | 4/1970 | Laibson .............. B29C 66/7392 |
| | | | 220/590 |
| 3,549,444 A | * | 12/1970 | Katz ..................... F04D 29/321 |
| | | | 156/175 |
| 5,798,156 A | | 8/1998 | Mitlitsky et al. |
| 7,588,655 B2 | | 9/2009 | Pham et al. |
| 7,820,092 B2 | | 10/2010 | Benson et al. |
| 9,242,393 B2 | | 1/2016 | Bland |
| 9,327,467 B2 | | 5/2016 | Robins et al. |
| 9,533,481 B2 | | 1/2017 | Garcia Martin et al. |

(Continued)

FOREIGN PATENT DOCUMENTS

| | | |
|---|---|---|
| EP | 0124205 A1 | 7/1984 |
| WO | WO-2017/184170 A1 * | 10/2017 |

(Continued)

OTHER PUBLICATIONS

Extended European Search Report for EP Application No. 19213102. 7, dated May 27, 2020, pp. 8.

*Primary Examiner* — Jeffry H Aftergut
(74) *Attorney, Agent, or Firm* — Kinney & Lange, P.A.

(57) ABSTRACT

A method of making a multi-section tank with composite material includes pre-tensioning the composite material, wrapping a soluble tool in the composite material, and curing the composite material around the soluble tool. The composite material is pre-tensioned with force to align fibers in the composite material.

17 Claims, 2 Drawing Sheets

(56) References Cited

U.S. PATENT DOCUMENTS

| | | |
|---|---|---|
| 9,561,602 B2 | 2/2017 | Jones et al. |
| 9,630,390 B2 | 4/2017 | Brown et al. |
| 10,076,899 B2 | 9/2018 | Aston et al. |
| 2014/0265043 A1* | 9/2014 | Oldroyd ............... B29C 70/345 264/482 |
| 2015/0316209 A1* | 11/2015 | Nettis ..................... F17C 1/06 220/589 |
| 2017/0024491 A1 | 1/2017 | Dodwell |
| 2017/0274621 A1 | 9/2017 | Coxon |

FOREIGN PATENT DOCUMENTS

| | | | |
|---|---|---|---|
| WO | WO-2017/184171 A1 * | 10/2017 | |
| WO | WO2017184171 A1 | 10/2017 | |

* cited by examiner

REDUCED WRINKLES IN MULTI-SECTION COMPOSITE TANK

CROSS-REFERENCE TO RELATED APPLICATION(S)

This application claims the benefit of U.S. Provisional Application No. 62/789,307 filed Jan. 7, 2019 for "REDUCED WRINKLES IN MULTI-SECTION COMPOSITE TANK" by N. Ching, W. Zhao and J. Hu.

BACKGROUND

The present disclosure relates to multi-section composite tanks. More specifically, the present disclosure relates to composite, high-pressure multi-section tanks for use in aircraft potable water systems.

Aircraft potable water systems supply drinkable water throughout an aircraft for various uses. Aircraft potable water systems typically include many parts, including but not limited to: multi-section tanks, hydraulic pumps, fluid heaters, control valves, and hydraulic fluid line tubing. The multi-section tanks used for aircraft potable water vessels are generally pressurized and must maintain their shape while under internal pressure.

Pressurized tanks for aircraft potable water systems generally contain multiple sections. Conventionally, metallic sheets are welded in the multi-section tanks.

The tank sections can also be made of a lightweight composite materials. Multiple plies of composite materials are first put together and then cured into the multi-section tank. Often, when the uncured composite material is placed to create the multi-section tank sections, wrinkles arise in the placement or layup process. In particular, the plies of the composite material can be bunched together into one area, causing a wrinkle.

These wrinkles are amplified when the whole multi-section tank is subsequently cured in high pressure conditions, such as in an autoclave. Additional wrinkles can form during this process. In cases where the vessel is of complex geometry, there is a higher probability of wrinkles forming. Wrinkled or uneven material is, in general, less strong than straight material. This causes uneven mechanical stresses throughout the vessel sections when the vessel is pressurized internally.

SUMMARY

In one embodiment, a method of making a multi-section composite tank includes pre-tensioning a composite material, surrounding the two mating sections of the soluble tool with the pre-tensioned composite material, aligning two mating sections of a soluble tool, curing the pre-tensioned composite material around the soluble tool, and washing out the soluble tool to form a multi-section tank.

DETAILED DESCRIPTION

Figure 1:
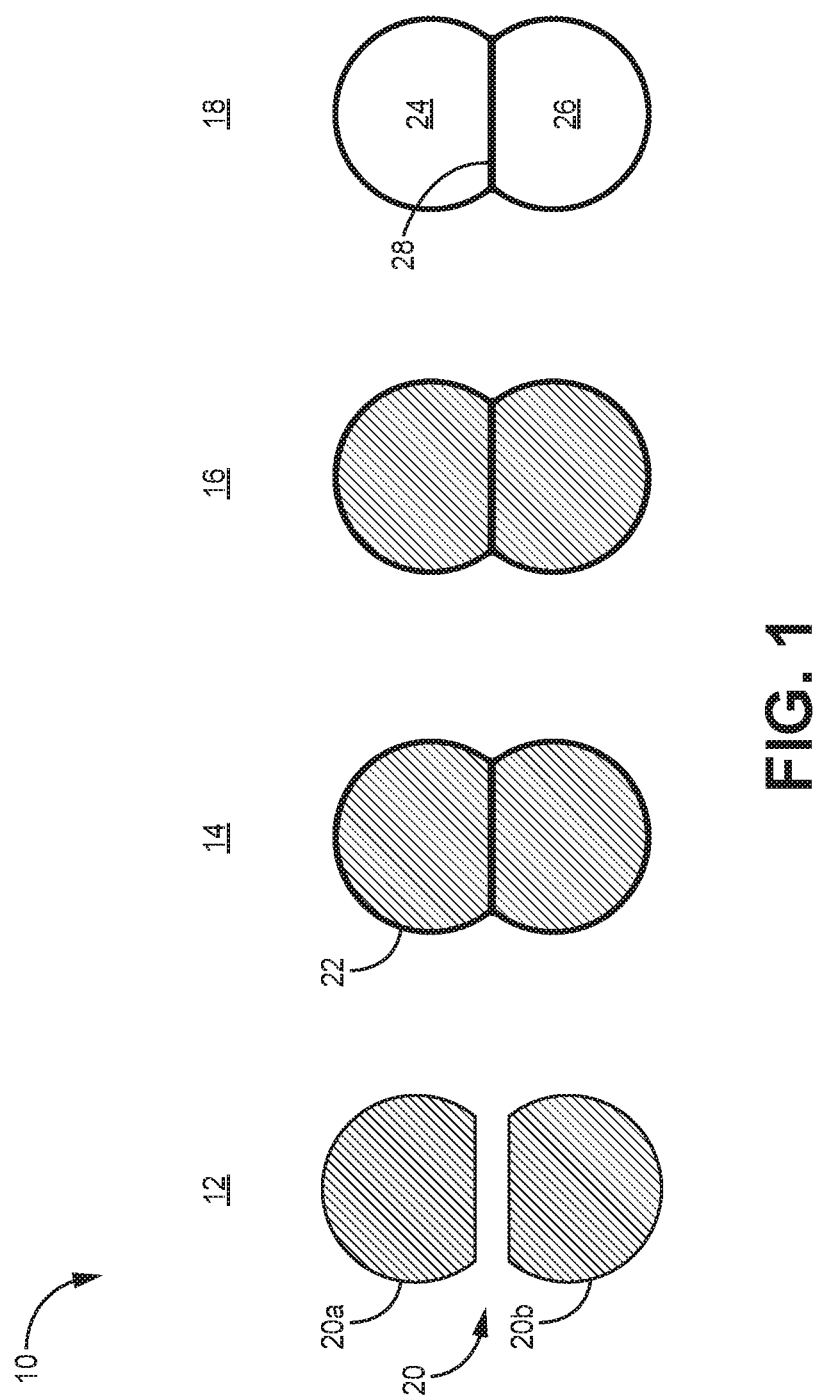
FIG. 1 is a schematic flow chart of a method of a build process for making a multiple-section tank.

When multi-section tanks are made through the process described in reference to FIG. 1, the composite material defining the sections of the vessel are prone to wrinkle formation in high temperature and pressure curing processes. Pre-tensioning of the composite material and material selection can prevent wrinkling and provide consistent final products, which is frequently a desirable result.

FIG. 1 is a schematic flow chart of a method of a manufacturing process for making a multi-section tank. Method 10 in FIG. 1 shows steps 12 to 18, with soluble tool 20, composite material 22, sections 24, 26, and shared wall 28.

First, in step 12, a soluble tool 20 is prepared. Soluble tool 20 has mating parts 20a and 20b, which are each of the desired size and shape corresponding to a finished section of the multi-section tank. Mating parts 20a, 20b are made prepared to accept a composite material 22 which will form the multi-section tank, and mating parts 20a, 20b are oriented as such. Soluble tool 20 is made of a salt, AquaCore® washout mandrel material, or any comparable material which can later in the process be easily removed.

Optionally, an elastomeric layer may be incorporated on the soluble tools 20a and 20b. In a later step, when composite around the tool with elastomer cures under external pressure and temperature, the elastomer expands with heat to create internal pressure to stretch the composite, therefore, reduce the tendency of wrinkle forming in the composite. The elastomer can be removed after the composite is cured and soluble tool is washed out.

Next, in step 14, composite material 22 is added around soluble tool mating parts 20a and 20b separately. Then, mating parts 20a and 20b, each enclosed in a first layer of composite material 22, are aligned and joined at the flat surface of 20a and 20b. Afterwards, a second layer of composite material 22 is placed around the joined assembly 20a and 20b. The composite material can be, for example, a pre-impregnated matrix having a resin and fibers as is known in the art. The resin can be, for example, a polymer such as a thermoplastic or thermoset, or other material appropriate in the art. The fiber can be a glass fiber, carbon fiber, or other material as appropriate in the art. Composite material can be made of a fabric having a unidirectional weave. Alternatively, the composite material 22 can be a stable weave pattern such as plain weave or a twill weave pattern. These tight weaves have a lesser tendency to form wrinkles. In some cases, unidirectional fiber pre-impregnated is used due to the ease of applying tension to it when adding it to the soluble tools, and its reduced tendency to wrinkle.

In some cases, a first layer of composite material 22 is wrapped around mating parts 20a and 20b. Prior to alignment of mating parts 20a and 20b, the first layers of composite material 22 is cured (as described below with reference to step 16). Then, an adhesive is applied to the internal portions of the cured first layer of composite material 22 and the mating parts 20a, 20b are aligned. Additional adhesive is applied to the outer surface of the first layer of composite material 22 to allow for adhesion to a second layer of composite material 22. In this case, the cured first layer of composite material 22 can be checked for wrinkles prior to alignment of mating parts 20a, 20b, and addition of the second layer of composite material.

Figure 2:
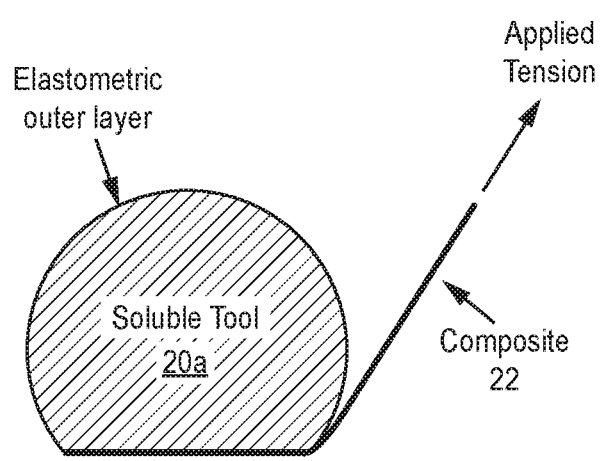
FIG. 2 is a schematic drawings showing pre-tensioning of a composite material for building a multi-section tank.

Prior to being wrapped around soluble tool 20, composite material 22 is pre-tensioned to tighten the fibers within the composite material 22 and prevent wrinkling forming due to fiber looseness. Pre-tensioning is shown in FIG. 2. Here, soluble tool mating part 20a is wrapped with composite material 22. Tension is applied to composite material 22 in the direction of arrow T.

Pre-tensioning can be done by hand or with the assistance of a device fixture. During pre-tensioning, the composite material 22 is stretched out with a tension force between 1 and 10 pounds per inch (1.75 to 17.5 Newton per centimeter). The tension is applied uniformly across the width of the fabric to prevent fabric weave pattern distortion. The amount of stretch applied to the composite material 22 is proportional to the temperature and pressure at which the composite material 22 will later be cured. The temperature and pressure at which pre-tensioning is done is also dependent on the expansion and compression on soluble tool 20 during the curing process. Pre-tensioned composite material 22 is more difficult to wrinkle and more resistant to folding or crinkling during curing processes.

Optionally, additional reinforcing portions of composite material 22 can be added to parts of the structure prone to wrinkling. In these areas, a piece of unidirectional fiber pre-impregnated fabric, or a relatively stiffer fabric (that is, stiffer compared to the primary composite material 22) comprising a resin and fibers analogous to the primary composite material can be applied to local areas prone to wrinkling, such as corners, joints between tank sections, or acute angles. These reinforcing portions can be cured with the primary composite material in step 16.

In step 16, the composite material 22 is cured around soluble tool 20. The composite material 22 cures to the shape of soluble tool 20 mating parts 20a, 20b, and in particular cures to create both external walls defining sections 24, 26 and shared wall 28. The composite material 22 can be cured, for example, in an autoclave at a range between 200 and 400 degrees Fahrenheit (93 and 204 degrees Celsius), with pressure between 10 psi (69 kPa) and 100 psi (689 kPa). Generally, the curing process can take between 1 and 3 hours.

Finally, in step 18, soluble tool 20 is washed out. This can be done by washing with water or other solvent capable of removing the soluble tool 20 without chemically reacting with composite material 22. Pressure washing and vibrating the tank aid in breaking up and removing soluble tool 20. This results in a multi-section, composite material tank with shared wall 28.

When a pre-tensioned composite layer is used, fewer wrinkles form. During the curing process, the temperature and pressure applied to the assembly cause soluble tool 20 to expand and contract depending on the amount of thermal expansion and compression under pressure. When the soluble tool 20 expands, the composite material 22 stretches. If composite material 22 has been pre-tensioned, wrinkling is avoided at the stage. If the soluble tool 20 contracts, the composite material folds in and causes wrinkles. However, if the composite material 20 is pre-tensioned as disclosed, the tool contraction may just release some of the tension in the composite and wrinkle are again less likely to form. The prevention of wrinkles by design reduces the dependence on operator experience and increase the quality of the final product.

Discussion of Possible Embodiments

The following are non-exclusive descriptions of possible embodiments of the present invention.

A method of making a multi-section composite tank includes pre-tensioning a composite material, surrounding the two mating sections of the soluble tool with the pre-tensioned composite material, aligning two mating sections of a soluble tool, curing the pre-tensioned composite material around the soluble tool, and washing out the soluble tool to form a multi-section tank.

The method of the preceding paragraph can optionally include, additionally and/or alternatively, any one or more of the following features, configurations and/or additional components:

The soluble tool is salt-based.

The soluble tool has an elastomeric outer layer.

The elastomeric outer layer is a thermoplastic or thermoset.

The composite material is a material having a unidirectional weave.

The composite material is a pre-impregnated fabric comprising a resin and a fiber.

The resin is a thermoplastic or a thermoset material.

The fiber is carbon fiber, carbon nanotube fiber, or glass fiber.

The composite material is plain weave fabric, wide-spaced woven fabric, twill, or a wave pattern woven fabric.

The method includes reinforcing the pre-tensioned composite material with a second composite material.

Reinforcing the pre-tensioned composite material comprises applying the second composite material at joints or corners or the multi-section composite tank.

Curing the pre-tensioned composite material is done between 200 and 400 degrees Fahrenheit (93 and 204 degrees Celsius).

Curing the composite material is done at a pressure between 10 psi (69 kPa) and 100 psi (689 kPa) for a duration between 5 minutes and 4 hours.

Pre-tensioning the composite material comprises applying a force of up to one to ten pound per inch (1.75 to 17.5 Newtons per centimeter) of material.

Pre-tensioning the composite material comprises stretching the composite material by hand or by machine.

Pre-tensioning the composite material comprises aligning fibers in the composite material.

Pre-tensioning the composite material comprises applying substantially uniform tension across the applied width of the composite material.

The method includes applying a second layer of the composite material to the aligned mating sections of the soluble tool.

The method includes further comprising curing the first layer of the composite material prior to adding the second layer of the composite material.

The method includes further comprising joining the second layer of composite material to the first layer of composite material with an adhesive.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a multi-section composite tank comprising:

pre-tensioning a first composite material;

surrounding two mating sections of a soluble tool with the pre-tensioned first composite material, wherein the soluble tool has an elastomeric outer layer;

aligning the two mating sections of the soluble tool;

locally reinforcing the pre-tensioned first composite material with a second composite material which is stiffer than the first composite material, wherein locally reinforcing the pre-tensioned first composite material comprises applying the second composite material at joints or corners of the multi-section composite tank;

curing the pre-tensioned first composite material around the soluble tool, wherein curing the pre-tensioned first composite material comprises applying heat to the elastomeric outer layer;

washing out the soluble tool to form a multi-section tank; and removing the elastomeric outer layer from the multi-section tank.

2. The method of claim 1, wherein the soluble tool is salt-based.

3. The method of claim 1, wherein the elastomeric outer layer is a thermoplastic or thermoset.

4. The method of claim 1, wherein the first composite material is a unidirectional fiber material.

5. The method of claim 1, wherein the first composite material is a pre-impregnated fabric comprising a resin and a fiber.

6. The method of claim 5, wherein the resin is a thermoplastic or a thermoset material.

7. The method of claim 5, wherein the fiber is carbon fiber, carbon nanotube fiber, Kevlar fiber, or glass fiber.

8. The method of claim 1, wherein the first composite material is plain weave fabric, twill weave fabric, or other stable-pattern fabric.

9. The method of claim 1, wherein curing the pre-tensioned first composite material is done between 200 and 400 degrees Fahrenheit (93 and 204 degrees Celsius).

10. The method of claim 1, wherein curing the pre-tensioned first composite material is done at a pressure between 10 psi (69 kPa) and 100 psi (689 kPa) for a duration between 5 minutes and 4 hours.

11. The method of claim 1, wherein pre-tensioning the first composite material comprises applying a force of 1 to 10 pounds per inch (1.75 to 17.5 Newton per centimeter) of material thereby aligning fibers in the first composite material.

12. The method of claim 1, wherein pre-tensioning the first composite material comprises stretching the first composite material by hand or by machine.

13. The method of claim 1, wherein pre-tensioning the first composite material comprises tightening fibers in the first composite material.

14. The method of claim 1, wherein pre-tensioning the first composite material comprises applying substantially uniform tension across the applied width of the first composite material.

15. The method of claim 1, further comprising applying a second layer of the first composite material to the aligned mating sections of the soluble tool.

16. The method of claim 15, further comprising curing the first layer of the first composite material prior to adding the second layer of the first composite material.

17. The method of claim 16, further comprising joining the second layer of the first composite material to the first layer of the first composite material with an adhesive.

* * * * *